United States Patent [19]

Lehmann

[11] Patent Number: 4,518,155
[45] Date of Patent: May 21, 1985

[54] FIXING DEVICE OF WORKPIECES FOR WIRE SPARK EROSION MACHINES

[75] Inventor: Franz Lehmann, Evilard, Switzerland

[73] Assignee: Imea SA, Reconvilier, Switzerland

[21] Appl. No.: 397,926

[22] Filed: Jul. 13, 1982

[30] Foreign Application Priority Data

Aug. 11, 1981 [CH] Switzerland .................. 5156/81

[51] Int. Cl.³ .................................................. B25B 1/02
[52] U.S. Cl. ...................................... 269/60; 269/101; 269/236; 269/283; 269/309
[58] Field of Search ............... 269/71, 60, 101, 235, 269/236, 204, 261, 283, 284, 282, 309, 310

[56] References Cited

U.S. PATENT DOCUMENTS

| | | | |
|---|---|---|---|
| 824,000 | 6/1906 | Elmer | 269/236 |
| 1,393,083 | 10/1921 | Campbell | 269/283 |
| 1,442,633 | 1/1923 | Strand | 269/284 |
| 1,450,940 | 4/1923 | Cobb | 269/204 |
| 1,825,460 | 9/1931 | Kappner | 269/236 |
| 1,834,294 | 12/1931 | Spahn | 269/71 |
| 2,190,585 | 2/1940 | Rhinevault | 269/261 |
| 3,063,707 | 11/1962 | Kelley | 269/204 |
| 3,849,857 | 11/1974 | Murray | 269/60 |
| 4,012,030 | 3/1977 | Hasselgren | 269/60 |
| 4,381,105 | 4/1983 | Goff et al. | 269/235 |
| 4,390,172 | 6/1983 | Gotman | 269/309 |
| 4,417,843 | 11/1983 | Bonga | 269/60 |

Primary Examiner—Robert C. Watson
Attorney, Agent, or Firm—Wender Murase & White

[57] ABSTRACT

The device comprises a generally L-shaped angle plate or base plate bearing a first jaw on the shorter leg of the "L", fixing plates and a slider capable of being shifted along the base plate and bearing a second jaw. The base plate is fixed at three points to fixing plates and is adjustable with respect to the fixing plates by means of vertical adjusting screws mounted in the base plate and acting upon supports movably resting against the fixing plates. Side or lateral adjusting screws acting against a pin attached to one of the fixing plates permit the base plate to effect a limited angular displacement about a ball disposed in the region of the base plate defined by the intersection of the legs of the "L". The device permits an accurate positioning and orientation of a workpiece relative to the wire of a spark erosion machine and to the direction of this wire in its working position.

12 Claims, 7 Drawing Figures

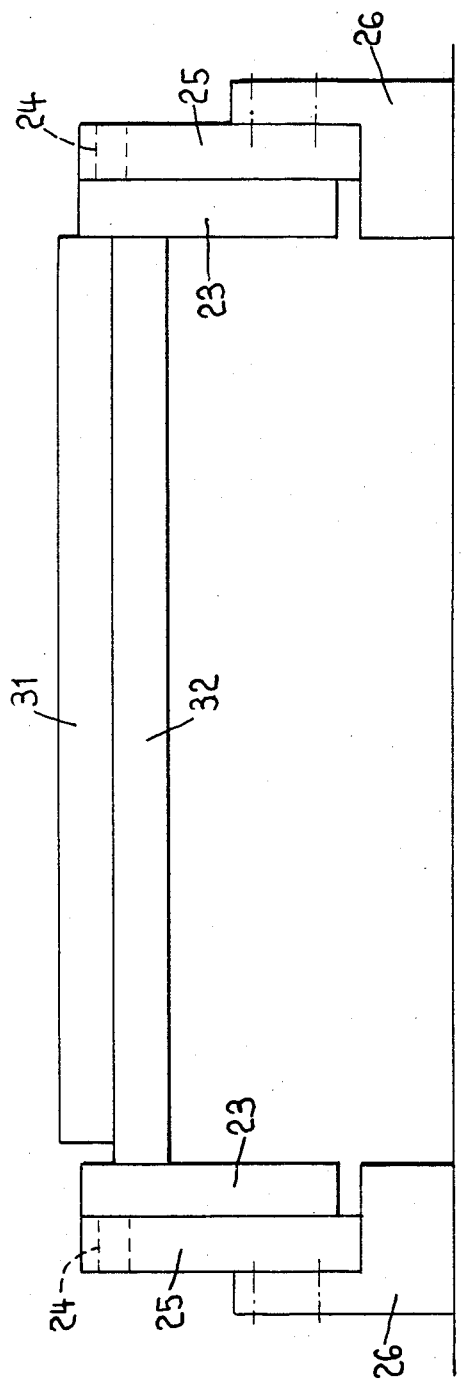
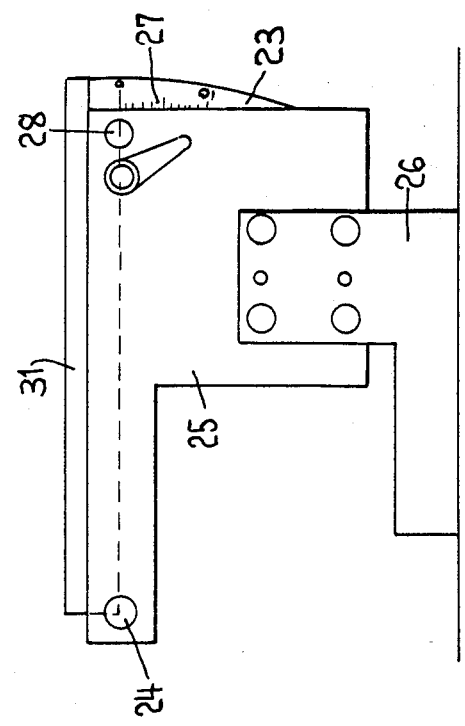
FIG. 4
FIG. 5

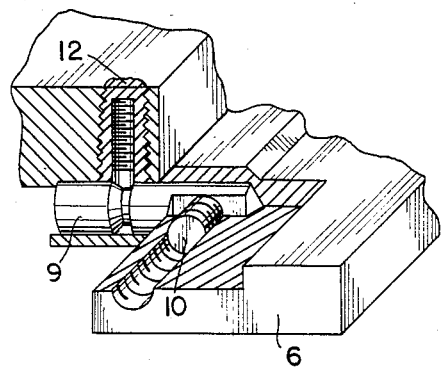
FIG. 6
FIG. 7
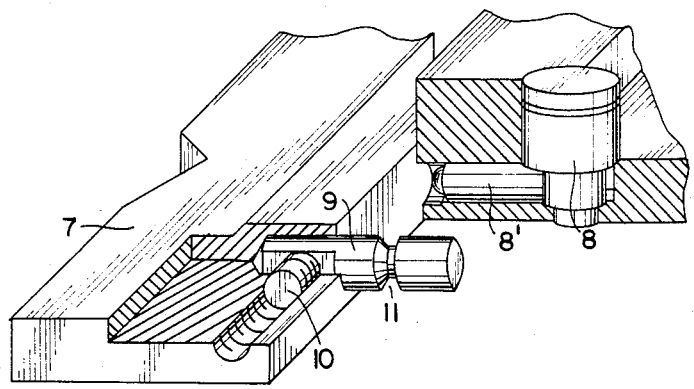

FIXING DEVICE OF WORKPIECES FOR WIRE SPARK EROSION MACHINES

BACKGROUND OF THE INVENTION

The present invention relates to a device for securing workpieces to a wire spark erosion machines as represented in the document AGIECUT DEM 25 published September 1976.

Such devices are already known which permit securing pieces having a plurality of various shapes and dimensions on wire spark erosion machines. These devices like the one represented in the document 091.000 IMEA-WIRE-CUT-SET are square shaped and the workpiece is fixed, as the case may arise, with or without stopping plates. The tightening with stopping plates is appropriate for wire spark erosion machines having a conventional sprinkling system while the tightening without stopping plates is utilized in the wire spark erosion machines with a high speed cutting outfit. This securing mode is preferred when the sprinkling ring of the wire spark erosion machine could come into contact with the stopping plate. However, although such devices improve the positioning accuracy of the workpieces, they are relatively static, in that they do not include any adjusting means for positioning the workpiece with respect to the wire and for orienting said workpiece in the direction of the wire in the working position of the latter In view of the foregoing, it is an object of the present invention to provide a device for securing workpieces on a wire spark erosion machine, which device enables the position and orientation of the workpiece with respect to the wire and to the direction of the latter in its working position to be controlled in a very precise manner.

SUMMARY OF THE INVENTION

In accordance with the present invention, the device comprises at least one substantially flat angle plate or base plate having a generally L-shaped configuration defined by a relatively shorter leg or branch which is intersected at a right angle by a relatively longer let or branch. The angle plate or base plate may be referred to as a "square" since the planes in which the inner edges of the intersecting shorter and longer legs lie define a 90° angle in the same manner as does a carpenter's "square".

A first jaw is mounted to the shorter leg and a slider bearing a second jaw is mounted to the longer leg for sliding movement toward and away from the shorter leg such that the first and second jaws will cooperate to grip any workpiece placed between the jaws. Fixing plates are provided for securing or fixing the device to a wire spark erosion machine, usually, on a worktable of the machine. The angle plate is adjustably mounted to and supported on the fixing plates so as to facilitate orienting the workpiece with respect to the direction of the wire in the working position of the latter in the machine.

The present invention will be described further as an example and with reference to the accompanying drawings in which:

BRIEF DESCRIPTION OF THE DRAWINGS

FIG. 4 is a front view of the device of FIG. 1 on its tiltable table, FIG. 5 is a side view of the device of FIG. 1 on its tiltable table, FIG. 6 is a perspective view, with portions removed and broken away for the sake of clarity of the jaw fixing means circled in FIG. 3, and FIG. 7 is a perspective view, with portions removed and broken away for the sake of clarity, of the eccentric cam locking means circled in FIG. 3.

DESCRIPTION OF THE PREFERRED EMBODIMENT

Figure 1:
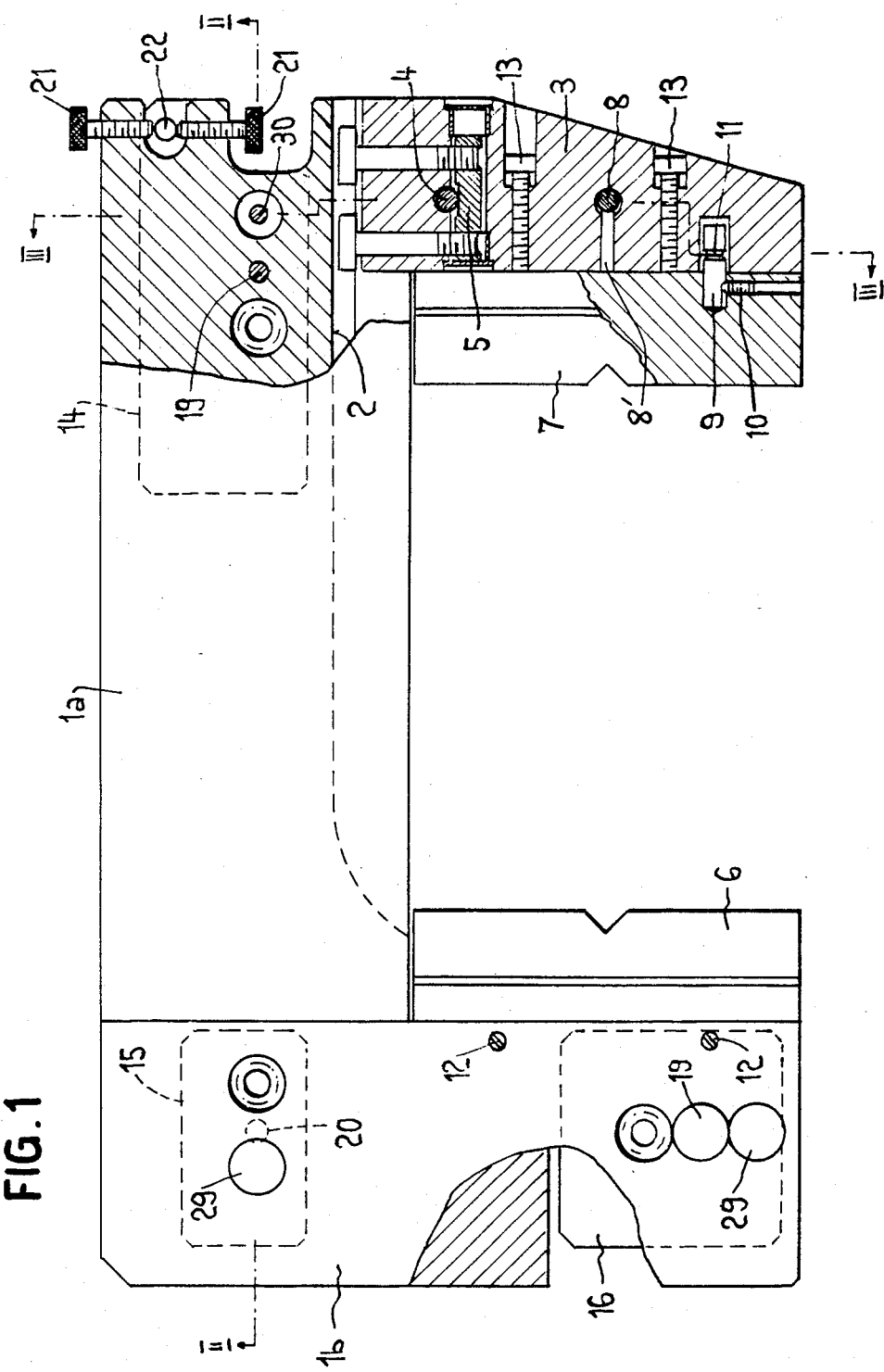
FIG. 1 shows a partly sectional plan view of the device according to the invention.
Figure 2:
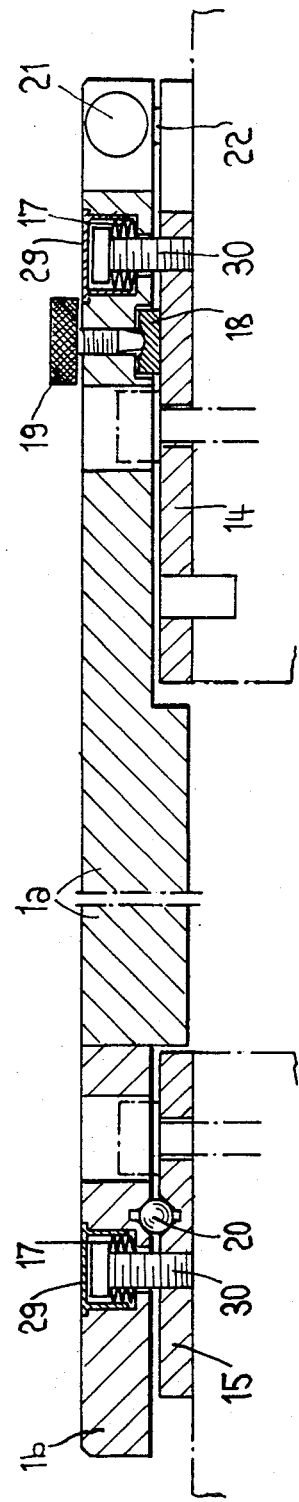
FIG. 2 shows a section along the line II—II of FIG. 1.
Figure 3:
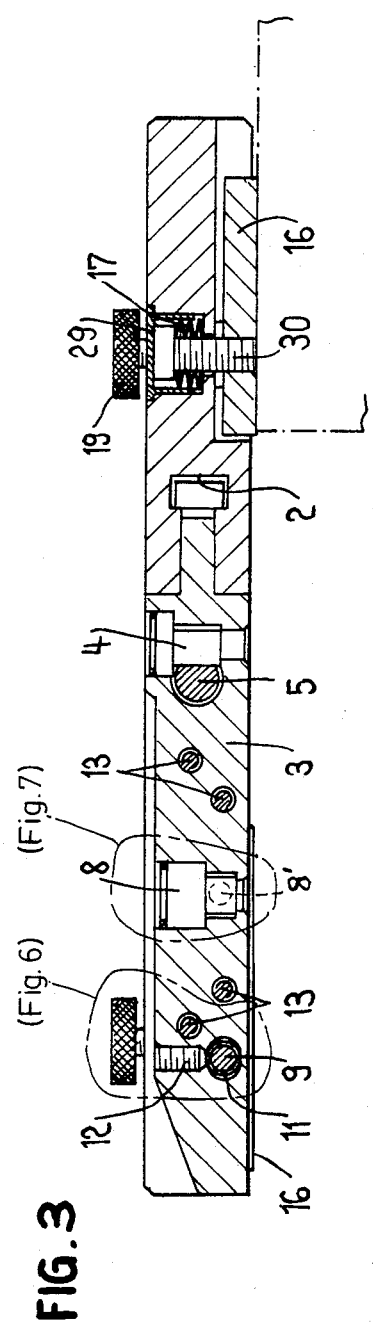
FIG. 3 shows a section along the line III—III of FIG. 1.

According to FIGS. 1, 2 and 3, the device comprises two substantially flat base plates 1a (long) and 1b (short), each one of rectangular configuration, assembled together in form of an L-shaped configuration which defines a "square." As a variant, the device may also be formed with a single L-shaped angle plate or base plate, comprising a long leg or branch (1a) and a short leg or branch (1b). The base plate 1a or the long leg of the single base plate comprises a T-shaped groove 2 in which a slider 3 is slidably mounted. The slider 3 is capable of being fixed to the base plate by means of a locking eccentric cam 4 acting against a locking spindle 5. The short leg of the base plate 1b or the short leg of the single base plate bears a jaw 6 and the slider 3 bears a jaw 7. During the operation of gripping a workpiece, the latter is placed against the jaw 6 and the slider 3 is manually shifted until the jaw 7 supported by this slider comes into contact with the other side of the workpiece. Then the eccentric cam 4 is used to lock the slider in place. A second eccentric cam 8, mounted in the slider 3 for cooperation with a pin 8′ is used for gripping the workpiece between the two jaws 6 and 7. In principle, each one of the jaws 6 and 7 may have any form adapted to the shape and to the dimensions of the workpiece. FIG. 1 shows that the jaws comprise a fastening pin 9 held by a screw 10 and comprising a groove 11 in which is engaged the end of a spring push-button 12 as indicated in FIG. 3. This shows that the fixing of the jaws to the base place and to the slider is easy and rapid, and that the jaws may be interchanged easily with other jaws of suitable configuration. In cases where the workpiece has non parallel faces, the angular position of the jaw 7 may be adapted within determined limits in the plane of the base plate because the fastening pin 9 is mounted with a play within the slider 3. The lack of parallelism may therefore be corrected within certain limits by a corresponding tilting of the jaw 7. Such tilting is facilitated by means of pressure screws 13 which can be actuated independently against the jaw 7. The pressure screws may also be used independently of the cam 8 and pin 8′, and when the workpiece has non-parallel sides, the pressure screws may be used in lieu of the cam 8 and pin 8′ to force the jaw 7 against the workpiece. FIG. 3 shows that the pressure screws 13 are four in number and in two pairs, according to the height of the jaws, e.g. 10 mm and 20 mm.

The device further comprises fixing plates 14, 15 and 16 mounted to the lower part of the base plate 1a, 1b. These fixing plates are themselves fastened to the base plate(s) by screws 30 and made tight by seal bonnets 29. Curved resilient washers 17 allow a limited displacement between the fixing plates and the base plates. Furthermore, the base plates 1a and 1b rigidly assembled in form of a square rest in three points on the fixing plates. Each one of the fixing plates 14 and 16 supports the base plate 1a+1b by a vertical adjusting screw 19 acting upon a support 18 movably resting against the respective fixing plate and the angle of the square rests upon a ball 20 disposed between the base plate and the fixing plate 15. The fixation in three points in accordance with a T-shaped configuration of the base plate permits the latter to be adjusted with respect to a single axis and by means of the vertical adjusting screws 19 it is possible to orient within certain limits the base plate and consequently the workpiece with respect to the direction of the wire of the spark erosion machine. This improves the accuracy of the machining due to the fact that the plane of the workpiece or the plane of the opening to be cut out into the workpiece may be rendered exactly perpendicular to the direction of the wire of the machine in the working position of this wire on the spark erosion machine.

FIG. 1 shows that the device according to the invention further comprises two adjusting screws 21 mounted on the base plate 1a and acting against a pin 22 fastened in the fixing plate 14. This permits a limited angular displacement of the base plate about the supporting ball 20.

The preceding shows that the device according to the invention has a flat-shaped configuration which facilitates its setting on the machine and permits the workpiece to be shifted up to the working position of the machining wire without any risk of collision with other elements of the machine. The device further comprises means for adjusting the orientation of the workpiece with respect to the direction of this wire.

FIGS. 4 and 5 show an embodiment in which the device and consequently the workpiece may be tilted a determined amount about an axis. To this end, the above described vice like device 31 comprises a supporting plate 32 on which it is mounted by its fixing plates 14 to 16. The plate 32 is set up between two supports attached to the machine and it is integral with the plates 23 which may rotate about an axis 24 in the supports 25 attached themselves to the bases 26 set up on the machine. As indicated in FIG. 5, this arrangement permits the device 31 to be tilted clockwise a determined angle about the axis 24. The inclination is indicated by a graduated scale 27. It is obvious that a shifting of the axis of rotation 24 toward the center of the jaws would allow the device to be tilted a determined angle in both directions of rotation. FIG. 5 shows that a stop 28 is provided at the position 0° of the device.

The elements of the above described device are preferably manufactured of stainless steel.

It is to be seen that the device according to the invention permits a wide number of adjustment possibilities of the position and of the orientation of the workpiece with respect to the wire of the spark erosion machine and with respect to the direction of this wire in its working position in the machine. This permits greatly increased accuracy of the positioning and of the orientation of the workpieces and facilitates the setting of the workpieces on the machine. In the case where the workpiece has a profile of a complicated form, it may be indicated to grip it between jaws having a negative form of this profile. Such jaws may be manufactured easily by wire spark erosion machining with the device according to the invention.

What I claim:

1. A device of flat configuration for securing a workpiece on a wire spark erosion machine, which comprises:
   an L-shaped base plate having a long leg and a short leg perpendicular to said long leg;
   first jaw means mounted to said short leg;
   slider means mounted to said long leg for sliding movement toward and away from said short leg;
   second jaw means mounted to said slider means and being adapted to cooperate with said first jaw means to grip a workpiece therebetween;
   fastening means for securing the device to a wire spark erosion machine, said fastening means being adjustably attached to said base plate so as to allow limited displacement of said base plate toward and away from said fastening means;
   adjusting means for positioning said base plate relative to said fastening means for orienting a workpiece gripped between said first and second jaw means with respect to the direction of the working position of the wire on the machine;
   said base plate being supported at three supporting points being located at the intersection of a longitudinal axis of said short leg and a longitudinal axis of said long leg, and the other two supporting points being located respectively at the extremities of said short leg and said long leg of said base plate.

2. The device according to claim 1, wherein said first and second jaw means lie in the plane of the base plate.

3. A device according to claim 1, wherein said adjusting means comprise vertical adjusting screws and said fastening means are fastening plates located with a limited play below the three supporting points of said base plate, said first supporting point comprising a ball located between said base plate and the corresponding fastening plate and the two other supporting points comprising said vertical adjusting screws mounted perpendicularly through said base plate and acting upon support means movably resting against the corresponding fastening plates such that said base plate is free to turn around said ball independently about said longitudinal axis of said short leg and about said longitudinal axis of said long leg of said base plate.

4. A device according to claim 3, further comprising lateral adjusting screws mounted in said base plate at the extremity of one of said legs thereof and a pin extending perpendicularly from the fastening plate corresponding to the extremity of said leg having said lateral adjusting screws mounted therein, said lateral adjusting screws acting against said pin for adjusting the angular displacement of said base plate in its plane about said supporting ball.

5. A device according to claim 1, wherein said slider means is secured to said base plate by means of a locking eccentric cam, said slider means further comprising a tightening eccentric cam for permitting the gripping of the workpiece between said first and second jaw means.

6. A device according to claim 1, wherein said second jaw means is fastened to said slider means with a play permitting a limited angular tilt of said second jaw means relative to said slider means in the plane of said base plate, said slider means comprising pressure screw means for pressing said second jaw means against the workpiece while said second jaw means is angularly tilted relative to said slider means to compensate for a lack of parallelism between the opposite sides of the workpiece being gripped by said first and second jaw means.

7. A device according to claim 1, wherein said first and second jaws means are held for easy and rapid interchangeability by a spring push-button, said spring push-button acting in a groove of a pin secured in each of said first and second jaw means.

8. A device according to claim 1, further comprising a supporting plate on which said fastening means are attached, said supporting plate being mounted in lateral supports fixed on the machine and being adjustable about a common axis of rotation of said supports.

9. A device according to claim 3, wherein all elements of said device are manufactured of stainless steel.

10. A device of flat configuration and generally horizontal disposition during use of securing a workpiece on a wire spark erosion machine, comprising an angle plate having a long branch and a short branch perpendicular to said long branch, a first jaw mounted to said short branch, a slider having a second jaw mounted thereto, said slider being manually shiftable along said long branch, fastening means for securing the device to a worktable of the machine, said fastening means being attached with a limited play to said angle plate by means of bolts, spring means being provided between said angle plate and said bolts for permitting a limited vertical displacement between said angle plate and said fastening means, and adjusting means acting between said angle plate and said fastening means for permitting said vertical displacement of said angle plate with respect to said fastening means.

11. A device of flat configuration and generally horizontal disposition during use for securing a workpiece on a wire spark erosion machine, comprising one base plate in the form of an angle plate with a long branch and a short branch perpendicular to said long branch, a first jaw mounted to said short branch, a slider having a second jaw mounted thereto; said slider being capable of being manually shifted along said long branch, fastening means for securing the device to a worktable of the machine, said angle plate being supported on said fastening means at a point in the angle of said base plate by a ball and at a point at each extremity of its said branches by adjusting means mounted on said angle plate and acting on said fastening means, the suspension at three points of said angle plate permitting said angle plate to be angularly positioned by said adjusting means with respect to a single axis of its long branch, respectively of its short branch, such that the plane of said angle plate may be oriented with respect to the direction of the working position of the wire on the machine.

12. A device of flat configuration and generally horizontal orientation during use for securing a workpiece on a wire spark erosion machine which comprises:
- a generally L-shaped, substantially flat base plate having a first relatively shorter leg portion and a second relatively longer leg portion extending perpendicularly form said first leg portion;
- said first leg portion having a first substantially flat edge extending along the length thereof and lying in a first plane;
- said second leg portion having a second substantially flat edge extending along the length thereof and lying in a second plane, said first and second planes being disposed at right angles to each other;
- first jaw means removably secured to said first leg portion adjacent to said first substantially flat edge;
- slider means removably mounted to said second leg portion for sliding movement along said substantially flat edge of said second leg portion toward and away from said first jaw means;
- second jaw means removably mounted to said slider means for cooperation with said first jaw means to grip a workpiece disposed therebetween;
- fastening means for securing the device to a worktable of the wire spark erosion machine, said fastening means comprising a first substantially flat plate secured to the worktable and adjustably secured to said second leg portion of said base plate, a second substantially flat plate secured to the worktable and adjustably secured to the worktable and adjustablably secured to said first leg portion, said first and second plates being disposed along a first line passing through the length of said second leg portion, and said second and third plates being disposed along a second line passing through the length of said first leg portion;
- said fastening means further comprising first adjustment means for effecting limited displacement of said second leg portion from said first plate about said line passing through said first leg portion, and second adjustment means for effecting limited displacement of said first leg portion away from said third plate about said line passing through said second leg portion; and
- third adjustment means for positioning said base plate with respect to said fastening means for orienting the workpiece gripped between the jaws with respect to the direction of the working position of the wire on the machine.

* * * * *